United States Patent
Ishida

(10) Patent No.: US 10,423,101 B2
(45) Date of Patent: Sep. 24, 2019

(54) CAM MECHANISM, FIXING DEVICE AND IMAGE FORMING APPARATUS

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/968,089

(22) Filed: May 1, 2018

(65) Prior Publication Data

US 2018/0341203 A1 Nov. 29, 2018

(30) Foreign Application Priority Data

May 24, 2017 (JP) .................. 2017-102577

(51) Int. Cl.
G03G 15/20 (2006.01)
F16H 25/14 (2006.01)
F16H 53/02 (2006.01)
G03G 21/16 (2006.01)

(52) U.S. Cl.
CPC ......... *G03G 15/2032* (2013.01); *F16H 25/14* (2013.01); *F16H 53/025* (2013.01); *G03G 15/2064* (2013.01); *G03G 21/1647* (2013.01)

(58) Field of Classification Search
CPC .................. G03G 15/2032–2035; F16H 25/14
See application file for complete search history.

(56) References Cited

U.S. PATENT DOCUMENTS

| 3,543,589 | A | * | 12/1970 | Loughran, Jr. | ...... H01H 43/125 200/38 B |
| 3,864,981 | A | * | 2/1975 | Schlegel | ................ B23Q 5/027 112/80.41 |
| 4,199,995 | A | * | 4/1980 | Murakami | ............. D05B 19/00 112/323 |
| 8,170,435 | B2 | * | 5/2012 | Ueno | ................. G03G 15/2064 399/67 |
| 9,037,059 | B2 | * | 5/2015 | Oomoto | ............. G03G 15/2032 399/329 |

(Continued)

FOREIGN PATENT DOCUMENTS

| JP | H09-325639 A | 12/1997 |
| JP | 2005-114959 A | 4/2005 |
| JP | 2009-139682 A | 6/2009 |

*Primary Examiner* — Clayton E. LaBalle
*Assistant Examiner* — Leon W Rhodes, Jr.
(74) *Attorney, Agent, or Firm* — Studebaker & Brackett PC

(57) ABSTRACT

A cam mechanism includes a cam, an output object and a counter object. The cam has a profile including an ascending region where a radius gradually increases along a rotating direction and a descending region where the radius gradually decreases along the rotating direction. The ascending region and the descending region are shifted each other by 180 degrees. The output object abuts on the cam with a predetermined pressure and linearly moves in an abutting direction in which the output object abuts on the cam and in a counter-abutting direction opposite to the abutting direction by rotating of the cam. The counter object abuts on the cam with the predetermined pressure from the counter-abutting direction at a position shifted by 180 degrees with respect to an abutting position between the output object and the cam.

9 Claims, 10 Drawing Sheets

(56) References Cited

U.S. PATENT DOCUMENTS 9,221,661 B2 * 12/2015 Mimbu ................... B66F 19/00
2010/0013150 A1 * 1/2010 Bryl ....................... B65H 5/062
271/274

* cited by examiner

PRIOR ART

PRIOR ART

CAM MECHANISM, FIXING DEVICE AND IMAGE FORMING APPARATUS

INCORPORATION BY REFERENCE

This application is based on and claims the benefit of priority from Japanese Patent application No. 2017-102577 filed on May 24, 2017, which is incorporated by reference in its entirety.

BACKGROUND

The present disclosure relates to a cam mechanism converting rotational motion to linear motion, a fixing device including the cam mechanism and an image forming apparatus including the fixing device.

An image forming apparatus is provided with a fixing device which heats and presses a toner image transferred on a sheet and fixes the toner image on the sheet. The fixing device includes a heating roller heated by a heat source and a pressing member being pressed against the heating member to form a pressing area through which the sheet passes. In order to remove the sheet jammed at the pressing area or in order to make the sheets having different thicknesses pass through the pressing area, the fixing device is sometimes made so as to vary a pressure of the pressing area. In such a fixing device, the pressing roller is made to move in directions close to or away from the pressing roller to vary the pressure of the pressing area. As a mechanism to move the pressing roller, a cam to convert rotational motion output by a drive source, such as a motor, to linear motion is used.

In the above fixing device, the pressing roller abuts on the cam by a biasing member. Thereby, a direction of load torque applied to the cam by the biasing member is changed from a rotating direction of the cam to a counter rotating direction between an ascending region and a descending region of the cam. Then, the cam may be shifted (jumping movement) by ratting of each member regardless of a driving force of the motor, and various problems, such as noise and vibration, may occur.

In addition, when a radius of the cam is varied in the ascending region and the descending region, a force applied to the cam from the biasing member is varied. Thereby, the motor rotating the cam is required to have sufficient output force for both acceleration and deceleration. Additionally, because an input current for the motor increases and decreases during the rotating of the cam, the motor is required to have capacity capable of withstanding the change of the input current.

SUMMARY

In accordance with an aspect of the present disclosure, a cam mechanism includes a cam, an output object and a counter object. The cam has a profile including an ascending region where a radius gradually increases along a rotating direction and a descending region where the radius gradually decreases along the rotating direction. The ascending region and the descending region are shifted each other by 180 degrees. The output object abuts on the cam with a predetermined pressure and linearly moves in an abutting direction in which the output object abuts on the cam and in a counter-abutting direction opposite to the abutting direction by rotating of the cam. The counter object abuts on the cam with the predetermined pressure from the counter-abutting direction at a position shifted by 180 degrees with respect to an abutting position between the output object and the cam.

In accordance with an aspect of the present disclosure, a fixing device includes a heating member, a pressing member and the cam mechanism. The heating member and the pressing member contact each other to form a pressing area where a toner is heated and pressed. The cam mechanism moves one of the heating member and the pressing member in directions close to and away from the other of the heating member and the pressing member to vary a pressure of the pressing area.

In accordance with an aspect of the present disclosure, an image forming apparatus includes an image forming part and the fixing device. The image forming part forms a toner image on a sheet. The fixing device fixes the toner image on the sheet.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, a cam mechanism, a fixing device and an image forming apparatus according to one embodiment of the present disclosure will be described.

Figure 1:
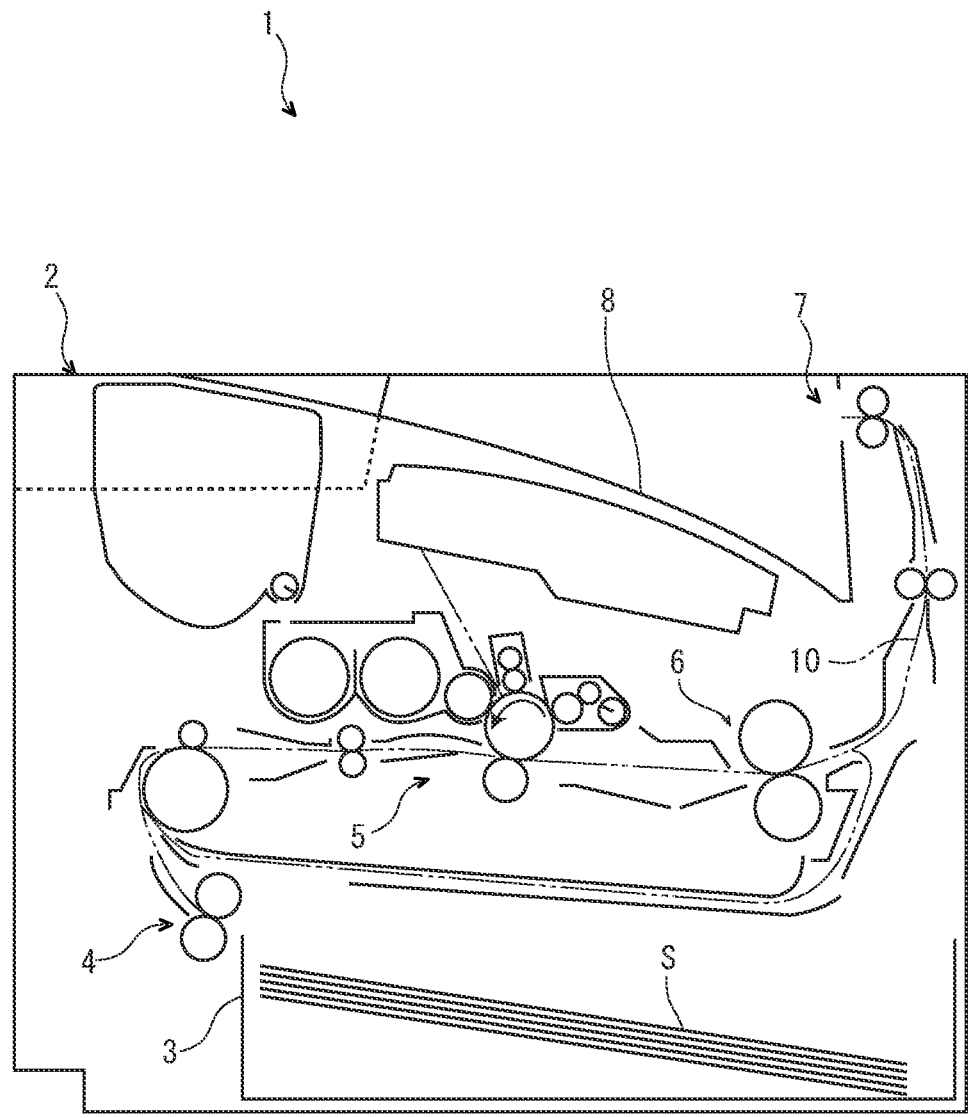
FIG. 1 is a front view schematically showing an inner structure of a printer according to one embodiment of the present disclosure.

With reference to FIG. 1, an entire structure of a printer 1 as an image forming apparatus according to an embodiment of the present disclosure will be described. FIG. 1 is a font view schematically showing an inner structure of the printer 1. In the following description, a near side (a front side) of a paper plan of FIG. 1 is decided to be a front side of the printer 1. In each figure, Fr, Rr, L, R Up and Lo respectively indicate a front side, a rear side, a left side, a right side, an upper side and a lower side of the printer 1.

An apparatus main body 2 of the printer 1 is provided with a sheet feeding cassette 3 storing a sheet S, a sheet feeding device 4 feeding the sheet S from the sheet feeding cassette 3, an image forming part 5 forming a toner image on the sheet S, a fixing device 6 fixing the toner image on the sheet S, an ejecting device 7 ejecting the sheet S on which the toner image is fixed and an ejected sheet tray 8 on which the ejected sheet S is stacked. In the apparatus main body 2, a conveying path 10 for the sheet S is formed so as to extend from the sheet feeding device 4 to the ejecting device 7 through the image forming part 5 and the fixing device 6.

Figure 2:
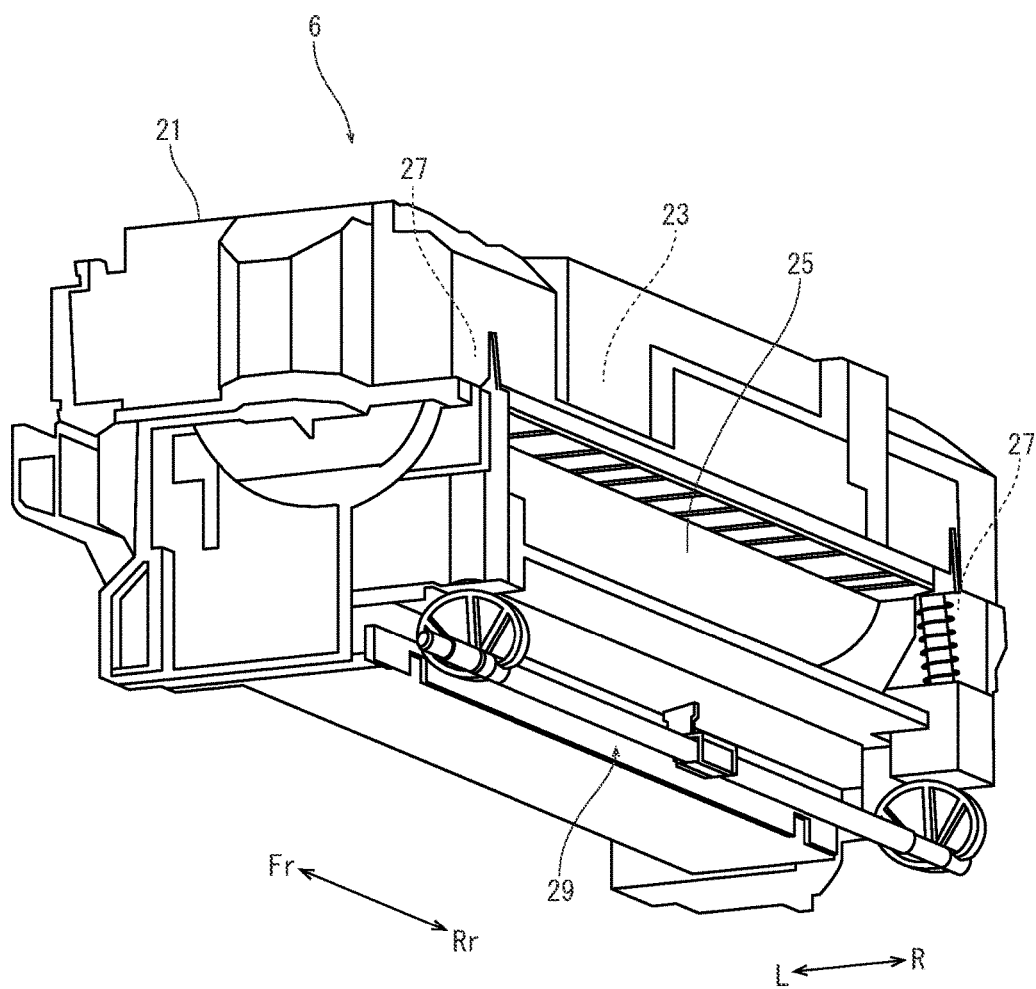
FIG. 2 is a perspective view showing a fixing device according to the embodiment of the present disclosure.
Figure 3:
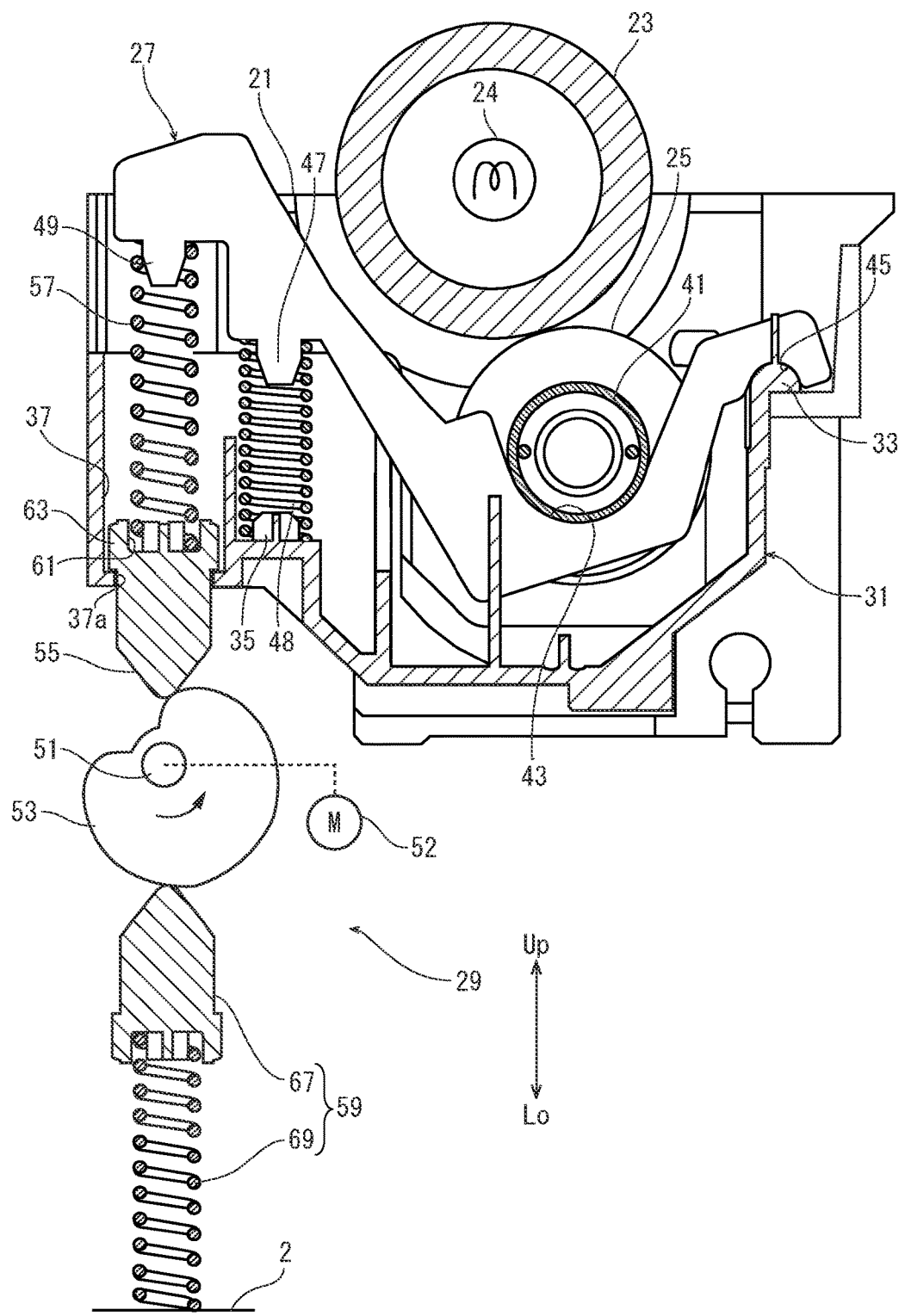
FIG. 3 is a sectional view showing the fixing device (when a pressure of a pressing area is decreased) according to the embodiment of the present disclosure.
Figure 4:
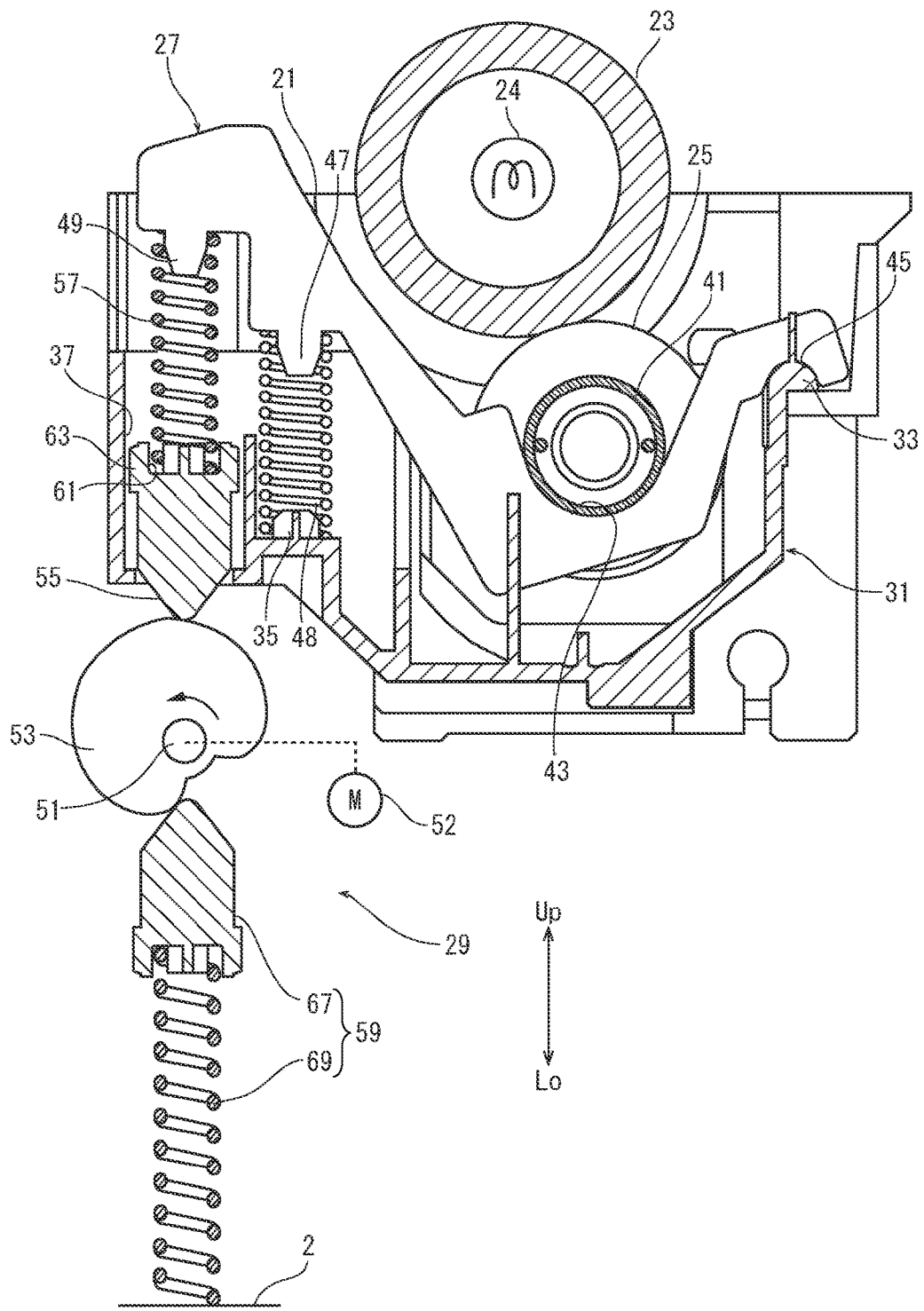
FIG. 4 is a sectional view showing the fixing device (when the pressure of the pressing area is increased) according to the embodiment of the present disclosure.

With reference to FIG. 2 to FIG. 4, the fixing device 6 will be described. FIG. 2 is a perspective view showing the fixing device, and FIG. 3 and FIG. 4 are sectional views showing the fixing device. FIG. 2 does not show a counter object of a cam mechanism described below.

As shown in FIG. 2, the fixing device 6 includes a fixing housing 21, a heating roller 23 and a pressing roller 25 which contact with each other to form a pressing area, a pair of pressing levers 27 supporting both ends of the pressing roller 25 and a cam mechanism 29 which turns the pair of pressing levers 27 to approach or separate the pressing roller 25 close to or away from the heating roller 23 and to change a pressure of the pressing area.

As shown in FIG. 3 and FIG. 4, at each of a front end portion and a rear rend portion of an inside of the fixing housing 21, a supporting part 31 by which the pressing lever 27 is supported is formed. At an upper end of a right end portion of the supporting part 31, a hemispherical protrusion 33 is protruded upwardly. On a bottom face of a left end portion of the supporting part 31, a housing side spring receiving part 35 and a holder storage part 37 are formed. The housing side spring receiving part 35 and the holder storage part 37 are arranged in the left and right direction in the order from the side closer to the protrusion 33. The holder storage part 37 is formed in a vertical bore extending in the upper-and-lower direction. An upper end face of the holder storage part 37 is opened, and a through hole 37a is formed on a lower wall of the holder storage part 37.

The heating roller 23 includes a cylindrical core metal made of metal, such as aluminum and iron, an elastic layer, made of silicon rubber, provided around the core metal and a release layer, made of fluororesin such as PFA, provided around the elastic layer. Both ends of the core metal are rotatably supported by the fixing housing 21. Inside a hollow space of the core metal, a heater 24 as a heat source is stored. The heater 24 is a halogen heater or a ceramic heater.

The pressing roller 25 includes a cylindrical core metal made of metal, such as aluminum and iron, an elastic layer, made of silicon rubber, provided around the core metal and a release layer, made of fluororesin such as PFA, provided around the elastic layer. Bearings 41 are fixed to both ends of the core metal.

The pressing lever 27 is formed in an approximately L-shaped member having a bent portion bent at nearly right angles. On an upper face of a rear portion of the bent portion, a roller receiving part 43 recessed downward in an arc shape is formed. By the roller receiving part 43, the bearing 41 of the pressing roller 25 is supported.

The pressing lever 27 has a recess 45, a first spring receiving part 47 and a second spring receiving part 49 which respectively correspond to the protrusion 33, the housing side spring receiving part 35 and the holder storage part 37 of the supporting part 31 of the fixing housing 21.

The recess 45 is formed on a right end portion of a lower face of the pressing lever 27. The recess 45 is engaged with the protrusion 33 such that the pressing lever 27 is turnable in the upper-and-lower direction around the protrusion 33.

The first spring receiving part 47 and the second spring receiving part 49 are arranged in the left and right direction on a left end portion of the lower face of the pressing lever 27 in the order from the side closer to the recess 45. A first spring 48 is interposed between the first spring receiving part 47 and the housing side spring receiving part 35. The first spring 48 biases the pressing lever 27 upward. Thereby, the pressing lever 27 is turned upward, and the pressing roller 25 is pressed against the heating roller 23 to form a pressing area between the rollers 23 and 25. The sheet is passed through the pressing area, and the toner image is fixed on the sheet.

The cam mechanism 29 includes a cam body 53 (a cam) fixed at each of both ends of a cam shaft 51 to be rotatably driven, a spring holder 55 as an output object abutting on each cam body 53, a second spring 57 which biases the spring holder 55 to the cam body 53 and makes the spring holder 55 abut on the cam body 53 and a counter object 59 abutting on the cam body 53 from a direction opposite to a biasing direction of the spring holder 55 at a position sifted by 180 degrees with respect to an abutting position (a contact point) between the spring holder 55 and the cam body 53.

The cam mechanism 29 is arranged in the holder storage parts 37 of the supporting part 31 of the fixing housing 21 and below the holder storage parts 37 along the front-and-rear direction. The cam mechanism 29 makes the pair of pressing levers 27 turn in the upper-and-lower direction around the protrusion 33.

The cam body 53 has a profile including an ascending region where a cam radius (a distance between a center of the cam shaft 51 and an outer circumferential face of the cam body 53) is gradually increased and a descending region where the cam radius is gradually decreased. The ascending region and the descending region are shifted each other by 180 degrees. The profile will be described later in detail. Each cam body 53 is arranged below each holder storage part 37, and is rotated in the counterclockwise direction in FIG. 3 and FIG. 4 when the cam shaft 51 is driven by a motor 52 to be rotated.

As shown in FIG. 3 and FIG. 4, the spring holder 55 is an approximately cylindrical member having a spring receiving recess 61 at the upper end face. Around an upper portion of an outer circumferential face of the spring holder 55, projections 63 are formed at predetermined intervals in the circumferential direction. A lower tip end portion of the spring holder 55 is formed in a cone shape protruding downward. The spring holder 55 is stored in the holder storage part 37 of the supporting part 31 of the fixing housing 21 in a movable manner in the upper-and-lower direction. The spring holder 55 protrudes through the through hole 37a so as to make the lower tip end portion abut on the cam body 53. The spring holder 55 is prevented from being removing from the holder storage part 37 by the projections 63 which are engaged with a peripheral edge of the through hole 37a.

The second spring 57 is interposed between the spring receiving recess 61 of the spring holder 55 and the second spring receiving port 49 of the pressing lever 27. In a state where the spring holder 55 is stored in the holder storage part 37 with the projections 63 engaged with the peripheral edge of the through hole 37a, a distance between the spring receiving recess 61 and the second spring receiving part 49 is the same as a free length of the second spring 57. When the spring holder 55 moves upward in the holder storage part 37, the spring holder 55 presses the second spring receiving part 49 of the pressing lever 27 upward via the second spring 57 and the pressing lever 27 is turned upward around the protrusion 33.

The counter object 59 includes a counter body 67 and a coil spring 69 of which one end is fixed to the counter body 67. The counter body 67 has the same configuration as the spring holder 55, and is formed to have a cone shaped tip end portion. The counter object 59 is arranged under the holder storage part 37 of the fixing housing 21 via the cam body 53. The other end of the coil spring 69 is fixed to the apparatus main body 2, and the coil spring 69 biases the counter body 67 upward. Thereby, the counter body 67 abuts on the cam body 53 from a direction (a lower direction) opposite to the abutting direction in which the spring holder 55 abut on the cam body 53, at a position shifted by 180 degrees around the cam shaft 51 with respect to the contact point between the spring holder 55 and the cam body 53. The coil spring 69 applies the same load as the load applied to the cam body 53 by the second spring 57 via the spring holder 55, to the cam body 53 via the counter body 67, in the ascending region and the descending region of the cam body 53, as described below.

Figure 5:
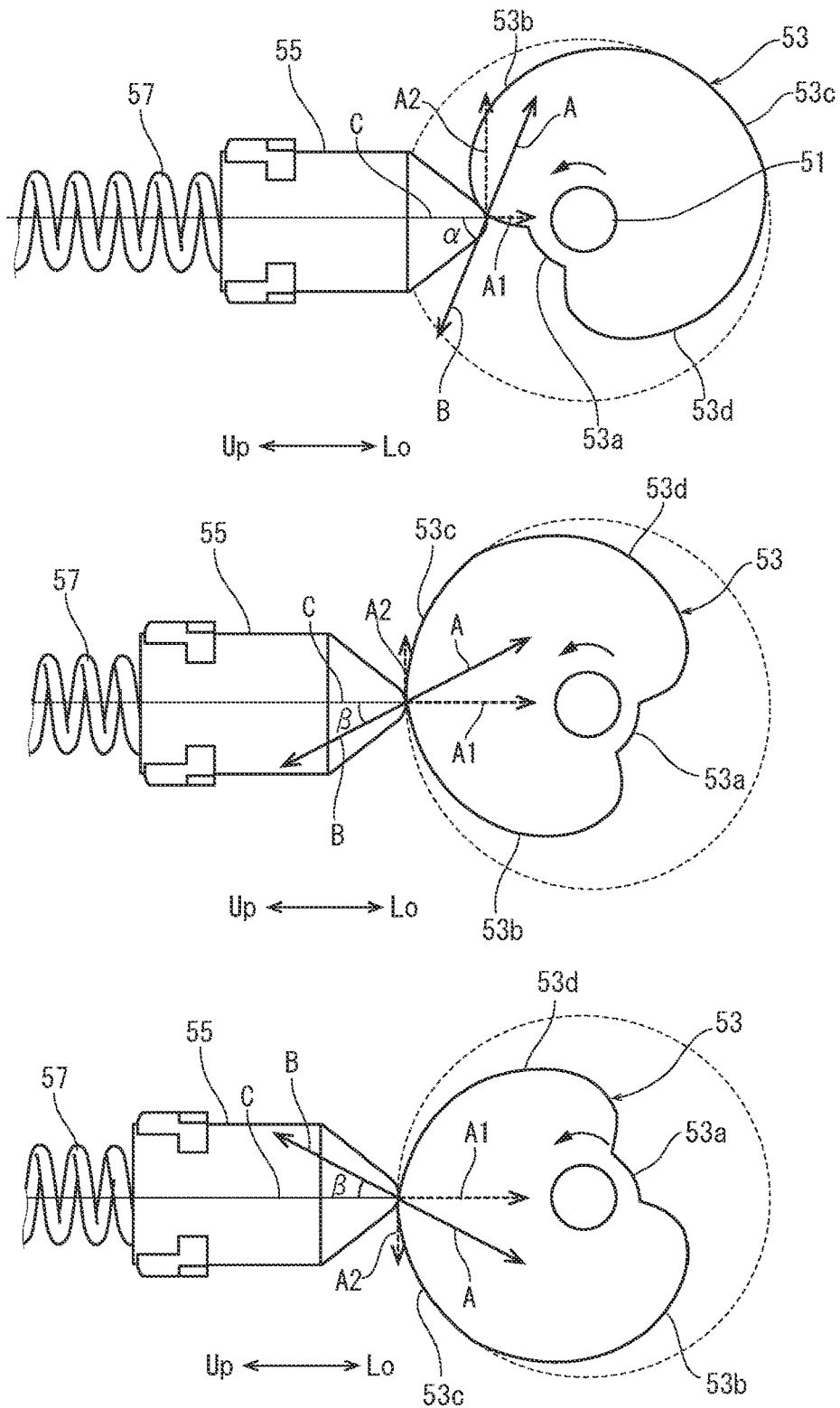
FIG. 5 is a side view showing a cam body of a cam mechanism according to the embodiment of the present disclosure.
Figure 6:
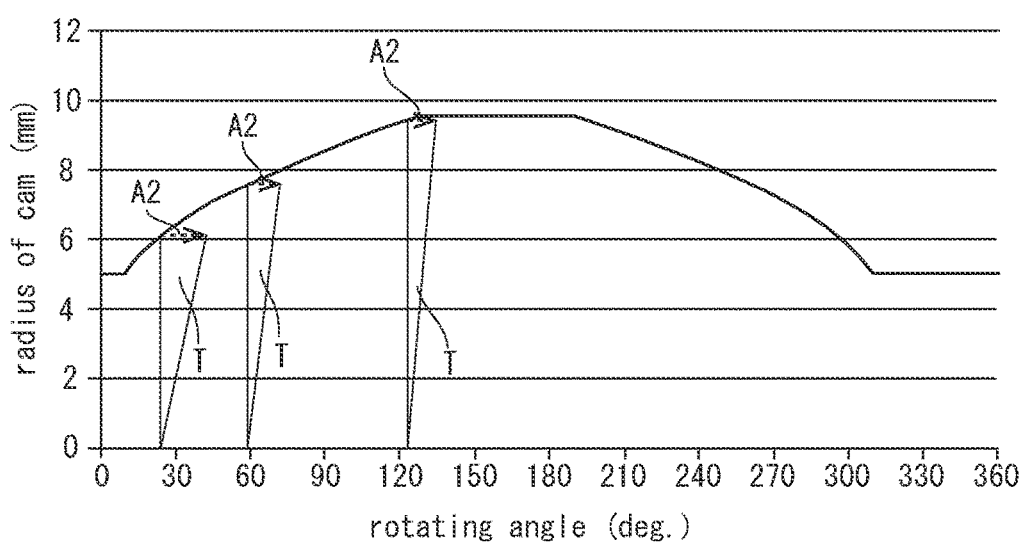
FIG. 6 is a graph showing a profile of the cam mechanism according to the embodiment of the present disclosure.

The cam body 53 will be described. With reference to FIG. 5 and FIG. 6, the profile of the cam body 53 will be described. FIG. 5 is a side view showing the cam body 53 and the spring holder 55 abutting on the cam body 53, and FIG. 6 is a graph showing the profile of the cam body 53. The left side and the right side of the paper plan of FIG. 5 respectively indicate the upper side and the lower side. In FIG. 6, the horizontal axis indicates a rotating angle of the cam body 53 and the vertical axis indicates a cam radius of the cam body 53.

As shown in FIG. 5, when the cam shaft 51 is driven, the cam body 53 rotates in the counterclockwise direction in FIG. 5. The cam body 53 has a profile including a small radius region 53a, an ascending region 53b, a large radius region 53c and a descending region 53d in this order along the counter rotating direction (the clockwise direction in FIG. 5) opposite to the rotating direction of the cam body 53. In the small radius region 53a, a cam radium (a distance between the center of the cam shaft 51 and the outer circumferential face of the cam body 53) is constant along the circumferential direction. In the ascending region 53b, the cam radius is gradually increased along the circumferential direction such that the spring holder 55 moves upward. In the large radius region 53c, the cam radium is constant along the circumferential direction. In the descending region 53d, the cam radius is gradually decreased along the circumferential direction such that the spring holder 55 moves downward. An upper figure in FIG. 5 shows the spring holder 55 after the start of the upward moving, a center figure in FIG. 5 shows the spring holder 55 before the end of the upward moving and a lower figure in FIG. 5 shows the spring holder 55 after the start of the downward moving. When the profile of the cam body 53 is considered along the rotating direction of the cam body 53, the descending region 53d corresponds to the ascending region where the cam radius is gradually increased along the circumferential direction, and the ascending region 53b corresponds to the descending region where the cam radium is gradually decreased along the circumferential direction. That is, the ascending region and the descending region give different definition between the rotating direction and the counter rotating direction of the cam body 53. In the present embodiment, as described above, the ascending region 53b and the descending region 53d are defined based on the counter rotating direction.

As shown in FIG. 6, the ascending region 53b and the descending region 53d are shifted by 180 degrees with respect to the center of the cam shaft 51. That is, a start position of the ascending region 53b and a start position of the descending region 53d are shifted by 180 degrees, and an end position of the ascending region 53b and an end position of the descending region 53d are shifted by 180 degrees.

The ascending region 53b and the descending region 53d of the cam body 53 are formed such that a contact angle α (described later) between the spring holder 55 and the cam body 53 is decreased as the cam radius is increased.

Figure 7:
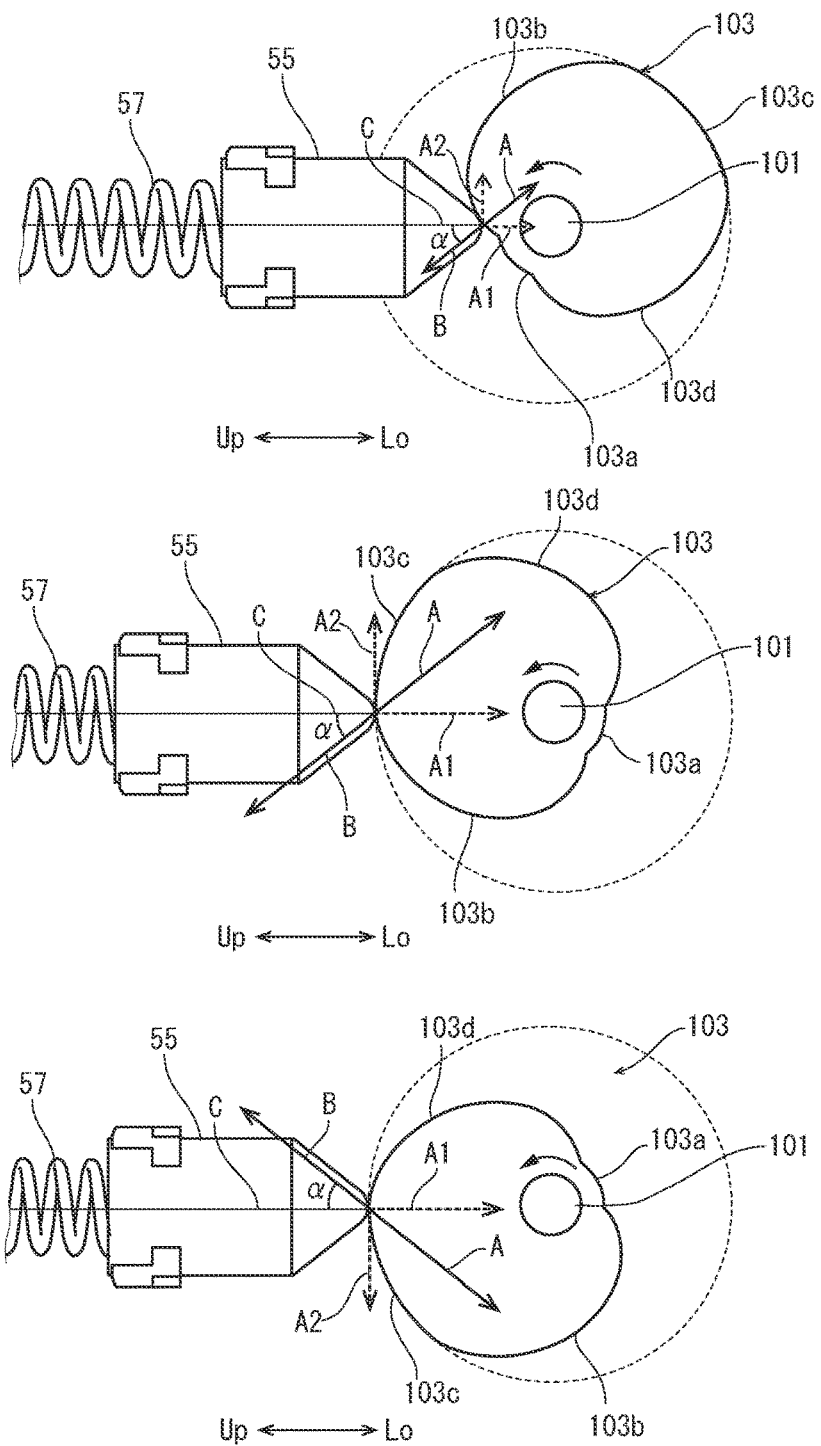
FIG. 7 is a side view showing a cam body of a cam mechanism according to a conventional embodiment.
Figure 8:
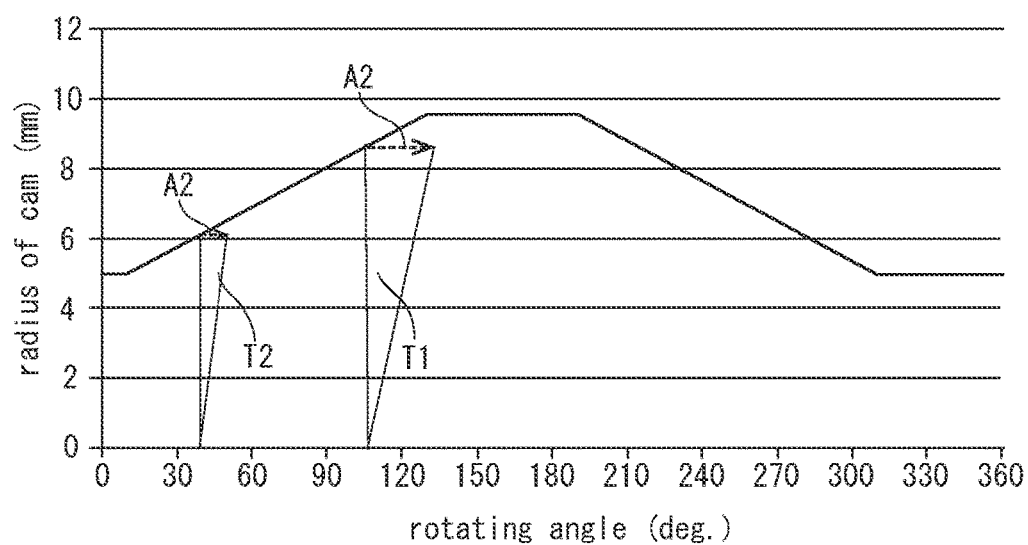
FIG. 8 is a graph showing a profile of the cam mechanism according to the conventional embodiment.

With reference to FIG. 7 and FIG. 8, in addition to FIG. 5 and FIG. 6, the contact angle and the profile of the cam body 53 of the present embodiment and a cam body 103 of the conventional embodiment will be described. FIG. 7 is a side view showing the conventional cam body 103 and the spring holder 55 abutting on the cam body 103, and FIG. 8 is a graph showing the profile of the conventional cam body 103. The left side and the right side of the paper plan of FIG. 7 respectively indicate the upper side and the lower side. An upper figure, a center figure and a lower figure in FIG. 7 respectively correspond to the upper figure, the center figure and the lower figure in FIG. 5. In FIG. 8, the horizontal axis indicates a rotating angle of the cam body 103 and the vertical axis indicates a radius of the cam body 103.

As shown in FIG. 7, the conventional cam body 103 has a profile including a small radius region 103a, an ascending region 103b, a large radius region 103c and a descending region 103d in this order in the counter rotating direction, as with the cam body 53. In addition, as shown in FIG. 8, the ascending region 103b and the descending region 103d are shifted by 180 degrees with respect to the center of the cam shaft 101.

Each arrow in FIG. 5 and FIG. 7 will be described. The solid line arrow A shows a normal force applied to each of the cam bodies 53 and 103 at a contact point between each of the cam bodies 53 and 103 and the spring holder 55. A direction of the normal force is the same as a direction of a common normal line at the contact point between each of the cam bodies 53 and 103 and the spring holder 55. The normal force A is divided into a force in the moving direction (the upper-and-lower direction) of the spring holder 55, shown by a chain line A1, and a force in a direction perpendicular to the moving direction, shown by a chain line A2. The chain line arrow A1 shows a force generated by the compressed second spring 57. The chain line arrow A2 shows a force to rotate each of the cam bodies 53 and 103, that is, a force to generate a load torque applied to each of the cam bodies 53 and 103. The solid line arrow B shows a normal force applied to the spring holder 55 at the contact point between each of the cam bodies 53 and 103 and the spring holder 55.

The contact angle α between the spring holder 55 and each of the cam bodies 53 and 103 shows an angle between the common normal line (a direction of the normal force, a direction of the solid line arrow A) at the contact point between the spring holder 55 and each of the cam bodies 53 and 103 and the moving direction of the spring holder 55 (the upper-and-lower direction, a direction of a solid line C).

With reference to FIG. 6 and FIG. 8, the load torque applied to each of the cam bodies 53 and 103 will be described. The load torque applied to each of the cam bodies 53 and 103, that is, the load torque applied to the motor driving each of the cam bodies 53 and 103 corresponds to an area of a triangle T expressed by making a magnitude of the force A2 to rotate each of the cam bodies 53 and 103 (a length of the vector) the base and making the cam radius at each rotating angle the height.

First, with reference to FIG. 7 and FIG. 8, the cam body 103 of the conventional embodiment will be described. As shown in FIG. 7, the cam body 103 of the conventional embodiment is configured such that the contact angle α is set to be constant in the ascending region 103b and the descending region 103d. In the other words, as shown in FIG. 8, an inclination of the cam radius with respect to the rotating angle is constant in the ascending region 103b and the descending region 103d. By making the contact angle α constant, it becomes possible to make the spring holder 55 abut on the cam body 103 stably. However, because the spring holder 55 is biased by the second spring 57, when the cam radius becomes large in the ascending region 103b, the second spring 57 is compressed to increase its elastic force, and the motor 52 is applied with large load torque. That is, depending on the contact point between the spring holder 55 and the cam body 103, the load applied to the cam body 103 by the second spring 57 via the spring holder 55 is varied.

As a result, as shown in FIG. 8, the load torque (corresponding to an area of the triangle T1) before the end of the ascending region 103b (at the contact angle α of 105 degrees) is larger than the load torque (corresponding to an area of the triangle T2) after the start of the ascending region 103b.

Next, with reference to FIG. 5 and FIG. 6, the cam body 53 of the present embodiment will be described. The cam body 53 of the present embodiment is configured such that the contact angle α becomes small as the cam radium becomes large in the ascending region 53b and the descending region 53d. In detail, the contact angle α at the start of the ascending region 53b, where the cam radius is small (refer to the upper figure in FIG. 5), is larger than the contact angle β before the end of the ascending region 53b, where the cam radius is large (refer to the center figure in FIG. 5) and after the start of the descending region 53d, where the cam radius is large (refer to the lower figure in FIG. 5). In the other words, as shown by the profile in FIG. 6, the inclination of the cam radius with respect to the rotating angle becomes sharp as the rotating angle becomes small, and becomes gradually gentle as the rotating angle becomes large, in the ascending region 53b and the descending region 53d.

As a result, as shown in FIG. 6, the load torque (corresponding to an area of the triangle T) is constant at each rotating angle (25 degrees, 60 degrees and 120 degrees) in the ascending region 53b. As described above, the load torque corresponds to an area of the triangle T expressed by making the magnitude of the force A2 to rotate the cam body 53 the base and making the cam radius at each rotating angle the height. Then, when the cam radius is small, the contact angle α is set to be large to increase the magnitude of the force A2 to rotate the cam body 53, and when the cam radius is large, the contact angle α is set to be small to decrease the magnitude of the force A2 to rotate the cam body 53. This makes it possible to make the area of the triangle T constant. Then, if the cam radius is varied in the ascending region 53b and the descending region 53d, it becomes possible to make the load torque applied to the cam body 53 constant.

The profile shown in FIG. 6 is set as the following manner. A minimum cam radius in the ascending region 53b and the descending region 53d is set to R0, the cam radius at any point X1 in the ascending region 53b and the descending region 53d is set to R1, the contact angle α at the point X1 is set to θ1, the cam radius at a point X2 separated away from the point X1 by a distance Δφ is set to R2, and the contact angle α at the point X2 is set to θ2. The cam radius R2 and the contact angle θ2 are set so as to satisfy the following relationship.

$$R2 = R1 + (R1 \times \Delta\varphi \times \tan\theta1)$$

$$\theta2 = a\sin(R1 \times (R1-R0)/R2 \times (R2-R1) \times \sin\theta1).$$

Figure 9:
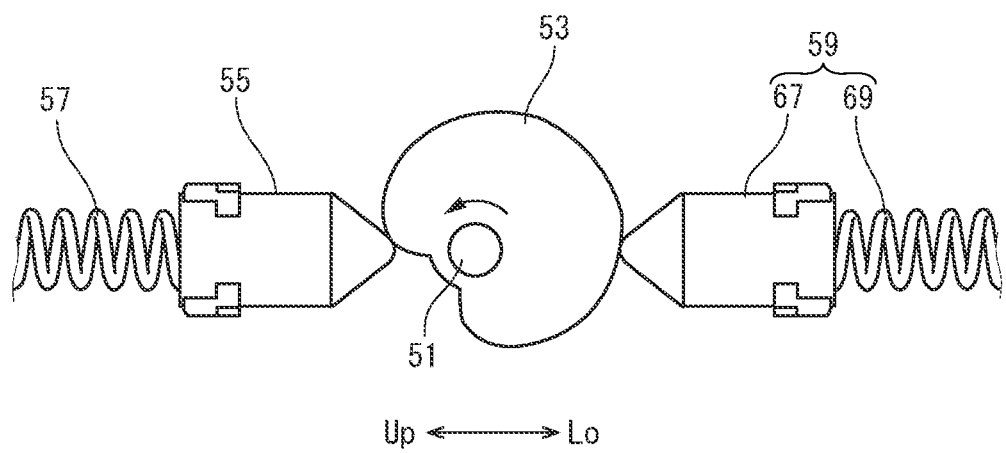
FIG. 9 is a side view showing the cam mechanism according to the embodiment of the present disclosure.
Figure 9:
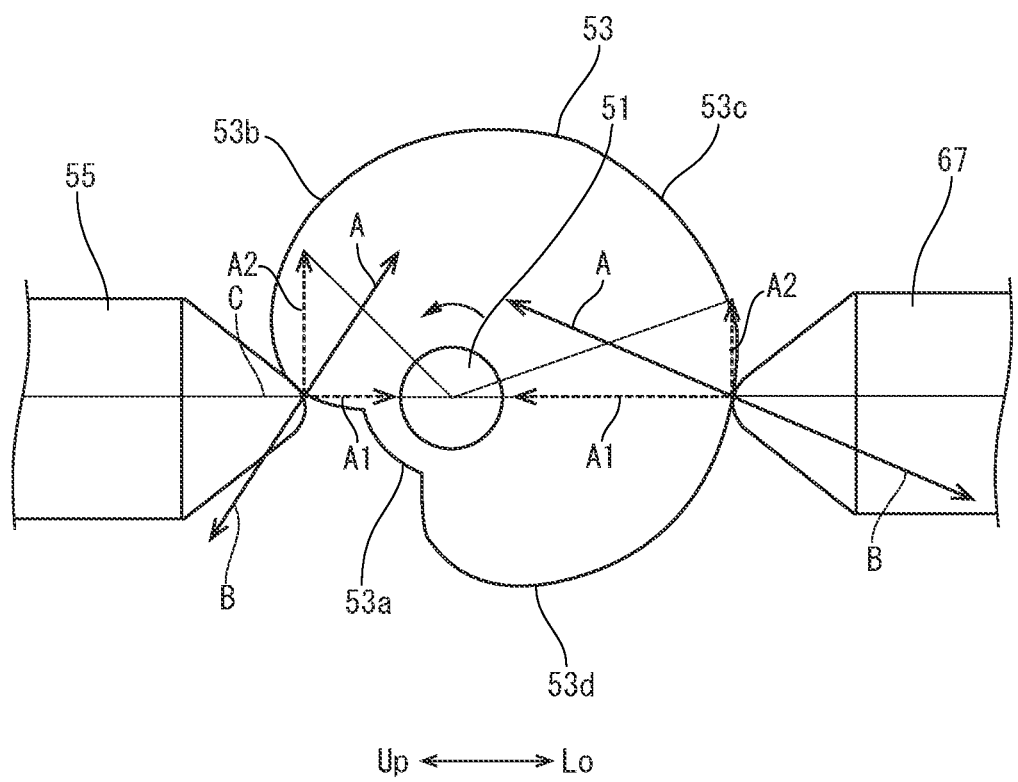

Next, the load applied to the cam body 53 from the spring holder 55 and the counter object 59 will be described with reference to FIG. 9 and FIG. 10. Each arrow and triangle in each figure is the same as the arrow and the triangle described in FIG. 5 to FIG. 8.

As described above, the ascending region 53b and the descending region 53d of the cam body 53 are sifted each other by 180 degrees, and the counter body 67 of the counter object 59 abuts on the cam body 53 at the position sifted by 180 degrees with respect to the spring holder 55. Thereby, when the spring holder 55 moves upward along the ascending region 53b, the counter body 67 moves downward along the descending region 53d.

Figure 10:
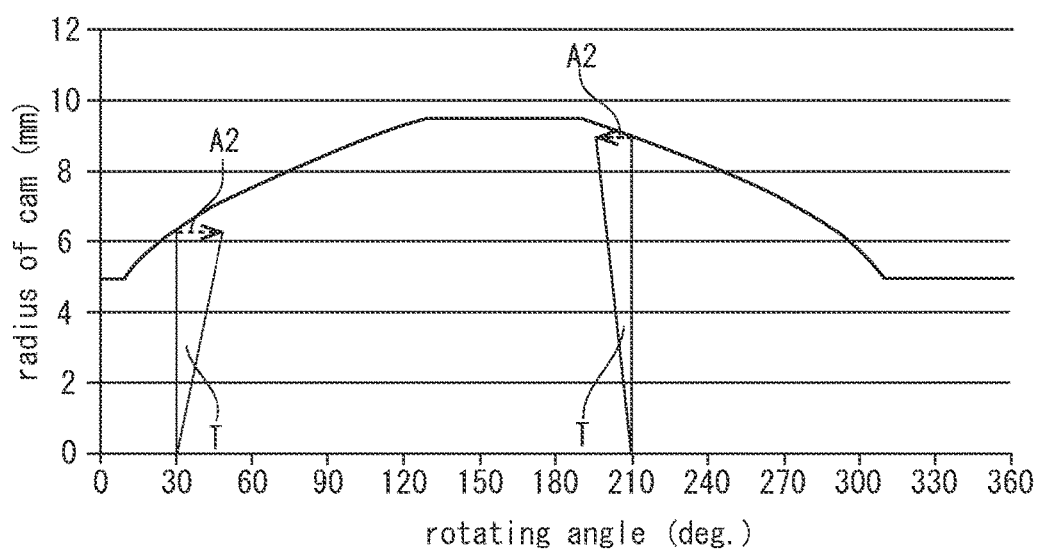
FIG. 10 is a graph showing a profile of the cam mechanism according to the embodiment of the present disclosure.

The load torque (corresponding to an area of the triangle shown in the right side in FIG. 10) applied to the cam body 53 from the coil spring 69 via the counter body 67 is the same as the load torque (corresponding to an area of the triangle shown in the left side in FIG. 10) applied to the cam body 53 from the second spring 57 via the spring holder 55. However, as shown by the lower figure in FIG. 9, a direction of the force A2 to rotate the cam body 53 (the force to generate the load torque) among the force applied to the cam body 53 from the second spring 57 is opposite to the rotating direction of the cam body 53. On the other hand, a direction of the force A2 to rotate the cam body 53 among the force applied to the cam body 53 from the coil spring 69 via the counter body 67 is the same as the rotating direction of the cam body 53.

When the force to generate the load torque is applied along the rotating direction of the cam body 53, the force applied along the rotating direction assists the rotating the cam body 53. On the other hand, when the force generates the load torque is applied along a counter rotating direction of the cam body 53, the force resists the rotating of the cam body 53. As described above, because the load torque applied to the cam body 53 from the spring holder 55 in the ascending region 53b is the same as the load torque applied to the cam body 53 from the counter body 67 in the descending region 53d, the load torque along the rotating direction and the load torque along the counter rotating direction are canceled. As a result, within all profile of the cam body 53, it becomes possible to make the load torque caused by the second spring 57 close to zero.

When the counter object 59 is not provided, the load torque is applied along the rotating direction in the ascending region 53b and then is applied along the counter rotating direction in the descending region 53d. Then, regardless of the driving force of the motor 52, the cam body 53 may be shifted by ratting of each member. If the cam body 53 is sifted, various problems, such as noise and vibration, may occur.

An operation to vary the pressure of the pressing area of the fixing device 6 having the above configuration will be described. In a state before the printer 1 is powered, the spring holder 55 is stored in the holder storage part 37 and the projections 63 are engaged with the peripheral edge of the through hole 37a. The cam body 53 is rotated such that the small radius region 53a faces the tip end portion of the spring holder 55. Under this state, the tip end portion of the spring holder 55 does not abut on the small radius region 53a of the cam body 53 and the second spring 57 is held with the free length. Thereby, the pressing lever 27 is not applied with the biasing force of the second spring 57 and is pushed upward by the biasing force of the first spring 48 to make the pressing roller 25 abut on the heating roller 23. The pressure of the pressing area at this state is set to a pressure P1. The counter body 67 of the counter object 59 abuts on the large radius region 53c of the cam body 53.

When the printer 1 is powered, the cam shaft 51 is rotated to rotate the cam body 53, and as shown in FIG. 3, the tip end portion of the spring holder 55 moves upward along the ascending region 53b from the small radius region 53a. On the other hand, the counter body 67 moves downward along the descending region 53d from the large radius region 53c. As described above, during the rotating of the cam body 53, because the load torque applied to the cam body 53 from the second spring 57 is theoretically nearly zero, the load applied to the motor 52 to rotate the cam shaft 51 is not varied. Additionally, the occurrence of noise and vibration caused by the ratting is not increased.

When the spring holder 55 moves upward along the ascending region 53b, as shown in FIG. 4, the spring holder 55 is pushed upward to push the second spring receiving part 49 of the pressing lever 27 upward via the second spring 57. Thereby, the pressing lever 27 is turned upward around the protrusion 33, the pressing roller 25 approaches the heating roller 23, and the pressing roller 25 is held at a position where the pressing force applied to the pressing roller 25 from the pressing lever 27 is balanced with the elastic force of the elastic layer of the pressing roller 25. Then, the pressure of the pressing area is varied to a pressure P2 larger than the pressure P1. At this time, the biasing force of the first spring 48 is applied to the pressing lever 27.

On the other hand, when the printer 1 is left, such as not being powered, the pressure of the pressing area is decreased such that the load applied to the heating roller 23 and the pressing roller 25 is decreased. Then, in this case, the cam shaft 51 is driven to rotate the cam body 53 such that the spring holder 55 is moved from the ascending region 53b to the small radius region 53a. As a result, the pressing of the spring holder 55 by the cam body 53 is released, the pressing lever 27 is not applied with the biasing force of the second spring 57 and the pressure of the pressing area is decreased to the pressure P1 from the pressure P2.

As described above, the cam mechanism 29 of the present disclosure is configured such that the ascending region 53b and the descending region 53d of the cam body 53 are shifted each other by 180 degrees. The counter member 76 and the spring holder 55 abut on the cam body 53 with the same load at positions sifted by 180 degrees. The direction of the force A2 to rotate the cam body 53 at the contact point between the spring holder 55 and the cam body 53 is opposite to the direction of the force A2 to rotate the cam body 53 at the contact point between the counter body 67 and the cam body 53.

As a result, the load torque along the rotating direction of the cam body 53 and the load torque along the counter rotating direction of the cam body 53 are canceled, and it becomes possible to make the load torque caused by the second spring 57 within an entire area of the profile of the cam body 53 close to zero. Accordingly, the noise and vibration caused by the ratting can be reduced.

In the ascending region 53b and the descending region 53d of the cam body 53, the contact angle between the spring holder 55 and the cam body 53 (the contact angle between the counter body 67 and the cam body 53) becomes small as the cam radius becomes large. This makes it possible to make the load torque applied to the cam body 53, that is, the load torque applied to the motor 52 from the spring holder 55 (the counter body 67) constant. Thereby, it becomes possible to decrease the maximum load applied to the motor 52 and to prevent the current variation of the motor 52 so that the motor 52 can be driven stably. If the cam body 53 has the conventional profile shown in FIG. 8, when the counter object corresponding to the counter object 59 of the present invention is provided, the effect to decrease the noise and vibration caused by the ratting can be obtained.

In the present embodiment, the cam mechanism 29 is applied to the printer. However, the cam mechanism 29 of the present invention can be applied to an image forming apparatus, such as a cloying machine, a facsimile and a multifunctional peripheral, a home appliance and an industrial device.

While the above description has been described with reference to the particular illustrative embodiments of the cam mechanism, the fixing device and the image forming apparatus according to the present disclosure, a technical range of the disclosure is not to be restricted by the description and illustration of the embodiment.

The invention claimed is:
1. A cam mechanism comprising:
a cam having a profile including an ascending region where a radius gradually increases along a rotating direction and a descending region where the radius gradually decreases along the rotating direction, the ascending region and the descending region being shifted each other by 180 degrees,
an output object abutting on the cam with a predetermined pressure and linearly moving in an abutting direction in which the output object abuts on the cam and in a counter-abutting direction opposite to the abutting direction by rotating of the cam, and
a counter object abutting on the cam with the predetermined pressure from the counter-abutting direction at a position shifted by 180 degrees with respect to an abutting position between the output object and the cam,
wherein the profile of the cam satisfies the following relationship;
a minimum radius of the cam in the ascending region and the descending region is set to R0,
the cam radius at any point X1 in the ascending region and the descending region is set to R1,
a contact angle at the point X1 is set to θ1, wherein the contact angle is an angle between a direction of a common normal line at the abutting position between the output object and the cam and a moving direction of the output object,
the cam radius at a point X2 separated away from the point X1 by a distance Δφ is set to R2, and
the contact angle at the point X2 is set to θ2,

$$R2=R1+(R1 \times \Delta\varphi \times \tan \theta1), \text{ and}$$

$$\theta2=a\sin(R1 \times (R1-R0)/R2 \times (R2-R1) \times \sin \theta1).$$

2. The cam mechanism according to claim 1,
wherein in the ascending region and the descending region, the contact angle becomes small as the radius of the cam becomes large.
3. The cam mechanism according to claim 1,
wherein a direction of a force to rotate the cam by the output object is opposite to the rotating direction of the cam, and
a direction of a force to rotate the cam by the counter object is the same as the rotating direction of the cam.
4. The cam mechanism according to claim 1,
wherein each of the output object and the counter object includes a coil spring and a spring holder to which one end of the coil spring is connected, the spring holder having a conical tip end portion.

5. A fixing device comprising:

a heating member and a pressing member which contact each other to form a pressing area where a toner is heated and pressed, and the cam mechanism according to claim 1, which moves one of the heating member and the pressing member in directions close to and away from the other of the heating member and the pressing member to vary a pressure of the pressing area.

6. An image forming apparatus comprising:

an image forming part forming a toner image on a sheet; and the fixing device according to claim 5, fixing the toner image on the sheet.

7. A cam mechanism comprising:

a cam having a profile including an ascending region where a radius gradually increases along a rotating direction and a descending region where the radius gradually decreases along the rotating direction, the ascending region and the descending region being shifted each other by 180 degrees, an output object abutting on the cam with a predetermined pressure and linearly moving in an abutting direction in which the output object abuts on the cam and in a counter-abutting direction opposite to the abutting direction by rotating of the cam, and a counter object abutting on the cam with the predetermined pressure from the counter-abutting direction at a position shifted by 180 degrees with respect to an abutting position between the output object and the cam, wherein each of the output object and the counter object includes a coil spring and a spring holder to which one end of the coil spring is connected, the spring holder having a conical tip end portion.

8. A fixing device comprising:

a heating member and a pressing member which contact each other to form a pressing area where a toner is heated and pressed, and the cam mechanism according to claim 7, which moves one of the heating member and the pressing member in directions close to and away from the other of the heating member and the pressing member to vary a pressure of the pressing area.

9. An image forming apparatus comprising:

an image forming part forming a toner image on a sheet; and the fixing device according to claim 8, fixing the toner image on the sheet.

* * * * *